L. HEDGE.
BELT SAW.
No. 8,056. Patented Apr. 22, 1851.
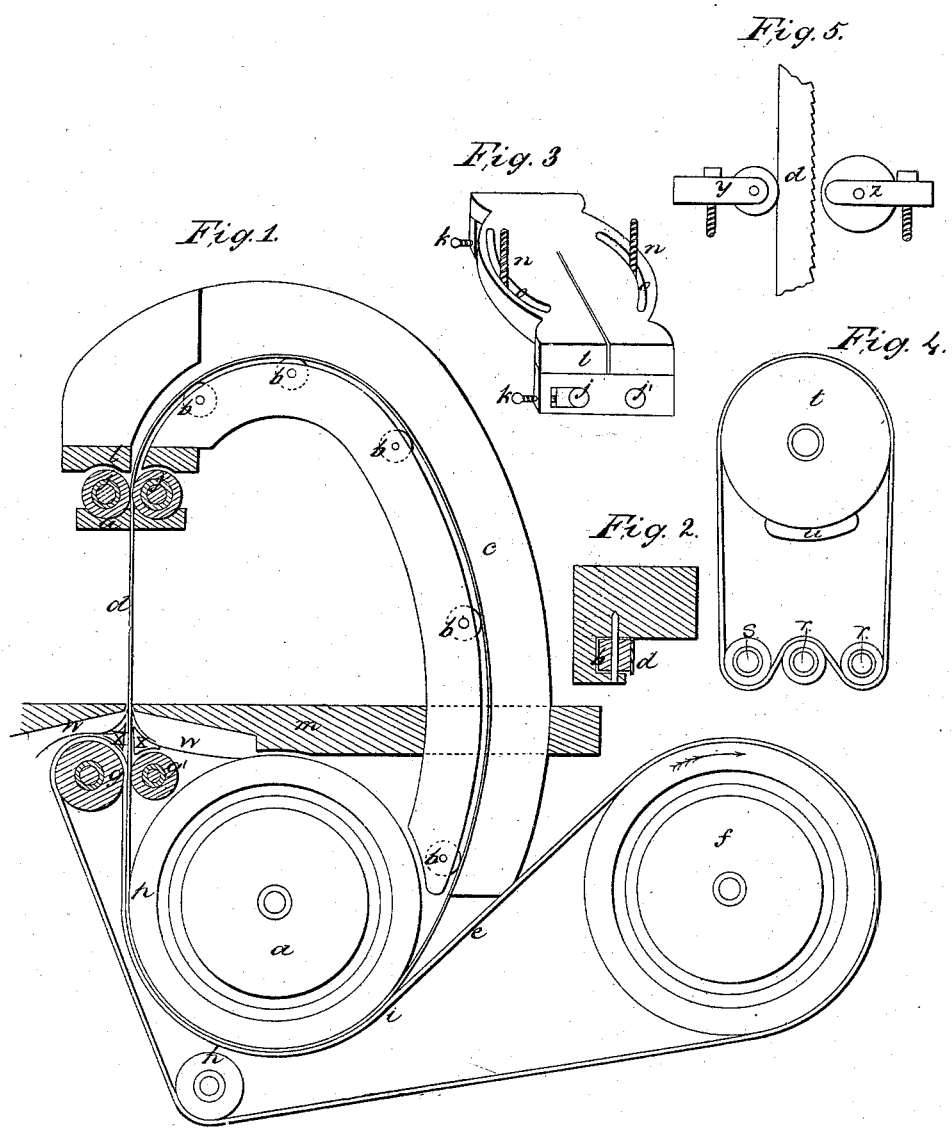

UNITED STATES PATENT OFFICE.

LEMUEL HEDGE, OF BROOKLYN, NEW YORK, ASSIGNOR TO GEORGE W. HEDGE.

SAWMILL.

Specification of Letters Patent No. 8,056, dated April 22, 1851.

*To all whom it may concern:*

Be it known that I, LEMUEL HEDGE, of Brooklyn, in the county of Kings and State of New York, have invented a new and Improved Mode of Lessening the Liability of Belt Saws to Break While in Operation; and I do hereby declare that the following is a full and exact description thereof, reference being had to the accompanying drawings and to the letters of reference marked thereon.

The nature of my invention consists in so arranging and combining the machinery as to prevent the necessity of straightening and straining longitudinally any other part of the saw excepting that portion of it which is at the time at work.

To enable others skilled in the art to use my invention I will proceed to describe its construction and operation.

The machinery as heretofore arranged, to adapt the belt saw to use, has made it necessary to keep the entire length of the saw in a high state of tension, by straining it over two drums or pulleys, in order that its adhesion to the faces of the pulleys should prevent its slipping, and also that the working portion of its length should be kept straight and sufficiently strained. Revolving with the pulleys in this strained state causes a sudden flexion from a straight to a curved, or from a curved to a straight line to be constantly occurring at four different points in its length; the effect of which is gradually to disintegrate the metal of which the saw is composed causing it to break by simply running, whether at work or otherwise; to prevent which is the object of my present invention.

Great care should be taken to have the plate of steel which is to form the saw, made perfectly straight, not only as respects its two parallel edges, but also its flat sides; so that, unconstrained, it will lie in close contact in all its parts, on any straight and true surface. Being so prepared, if its two ends be brought together and joined, it will assume a circular or hoop form. If means be now used to change a portion, say one-fourth or one-fifth of its length from a circular to a straight line, the remaining part will naturally assume the form of a curve resembling an ellipse, as shown at Figure 1, (see drawing). The lower part of this curve is formed by a segment of the pulley $a$, and the remaining part by the friction pulleys $b$, $b$, &c., inserted in the pillar $c$, of corresponding curve. A transverse section of this pillar, cut off at the center of one of the friction pulleys $b$, is shown at Fig. 2. The blue line $d$, Figs. 1 and 2 represent the saw. Motion is given to the whole apparatus by the belt $e$, which passes from the drum $f$, under a segment of the pulley $a$, taking the saw between it and the face of the said pulley; and with the tension of the belt pressing the saw into contact with the face of the pulley. The belt thence passes up to, and around one of the lower guide rollers $g$, thence back under the friction pulley $h$, and joins. The drum $f$, being driven by the motive power in the direction indicated by the arrow, the belt will take the saw along with it. It is here in place to notice that by this arrangement, the adhesion of the saw to the face of the pulley, is effected by the pressure of the belt, and not by any longitudinal tension of the saw, and that the force which propels the saw acts at no particular point, but is distributed along the space commencing at $i$, the point of contact of the saw with the pulley, and ending at the point of contact of the roller $g$, with its fellow $g'$.

The two pairs of rollers $g$, and $g'$, and $j$ and $j'$ serve the double purpose of guiding the saw as to the inclination of its edge, and also that of straightening and straining the working portion of its length. Both pairs of these rollers are secured in contact with the opposite sides of the saw, by set screws; two of which appear at $k$, $k$, Fig. 3, which is a detached view of the movable frame work which sustains the upper pair of rollers $j$ and $j'$. A part of the front end of this movable roller frame is shown at $l$, Fig. 1, which designates its location. It is attached to a surface on the pillar $c$, made parallel with the bench $m$, by the screws $n$, $n$, which pass through the circular slots $o$, $o$. This frame should be so placed, as that the center of the slots shall coincide with the center of the width of the saw. The use of having this frame with the pair of rollers which it sustains, made movable around such center is, that by means of it a true adjustment of the saw may be effected when required to saw true surfaces; and also that when tortuous or winding surfaces are required to be sawed, the saw, by the same means may be twisted to a corresponding wind. The other use of these two pairs of rollers, viz., to straighten and strain the working portion of the saw will now be explained. It has already been shown above that the pair of rollers $g$, and $g'$, are intended to exert a helping agency in drawing the saw along in a downward direction. The amount of this agency may be increased or diminished by screwing them up by the set screws to a harder or lighter contact with each other. The design is to cause them to overcome at least half the resistance, for the purpose of taking off that amount of longitudinal strain from the saw at the point (P,) of its flexure from a straight to a curved line, which is the point which most exposes the saw to the injury of disintegration. I apply a break $u$ Fig. 1, to the upper pair of rollers $j$ and $j'$ which is designed to have a retarding effect upon these rollers equivalent in action to pulling the saw in a direction contrary to that just above described; thus by these means any required degree of tension may be given to the working portion of the saw, while most of the remaining part is left entirely free from longitudinal strain.

If in the practice of heavy work the required retarding force should be so great as to cause injurious heating of the parts, such a device as is shown at Fig. 4 (or any other similar one) may be substituted. Here $r$, $r$, represent pulleys attached to the arbors of the rollers $j$ and $j'$—$s$, a friction pulley and $t$, a pulley of larger diameter, to which the break $u$, is applied. $v$, represents a belt, and indicates the manner of applying it so as to have the required effect.

In addition to the guide rollers above described, others, $y$ and $z$ Fig. 5 at the back and front of the saw, are required; the former to counteract the pressure in feeding up the work, and the latter to guard against drawing the saw forward out of its place, in withdrawing the work just done; the centers of these should be placed as nearly on a line with the centers of the side rollers as circumstances will admit.

Immediately beneath the bench I apply thin plates of elastic metal $w$, $w$, Fig. 1, (supported on the timbers $x$, $x$,) reaching to the front, and beyond the back edge of the saw. One end of each of these pieces, being curved up, rests against the side of the saw, and pressing slightly with its own elasticity against it, serves as a constant scraper, to scrape, and carry off as the saw passes, any gumming matter, or dust, which may adhere to it.

What I claim as my invention and desire to secure by Letters Patent is—

1. The method substantially as herein described of driving belt saws by the friction surface of two cylindrical pulleys or drums which grip the saw plate below the wood which is being cut, but at some part of its tangent line, so that the strain to which it must be subjected in cutting to keep it in the line of the tangent shall not be at any part of its curved path; but this I only claim in combination with straining rollers which grip the saw above the lumber on which it acts, the said rollers being controlled by a brake or the equivalent thereof, substantially as described, whereby the saw during its action is kept in a strained condition along its entire line of action, that it may cut in a straight line, and to avoid its being under tension where the flexions take place along the curved portions of its track as specified.

2. I also claim in combination with the mode herein specified of driving a belt saw by means of cylindrical rollers or pulleys, the employment of a belt passing around the outer one of the said driving rollers and applied to the outer surface of the saw where it passes around the lower deflecting or guide pulley, substantially as herein described, by means of which the saw is bent by the pressure of the belt applied to its outer surface, instead of being communicated through the metal itself, thus avoiding in a great measure the tendency to break the metal.

3. And finally I claim in combination with the mode substantially such as herein described of driving a belt saw, the employment of fenders or scrapers interposed between the driving rollers and the wood to be sawed, and placed each side of the saw, as described, to catch the saw dust and conduct it away from the bight of the driving rollers or the saw, and thus avoid clogging.

LEMUEL HEDGE.

Witnesses:
  W. C. HERBERT,
  HOLMES W. MURPHY.